Patented Feb. 19, 1935

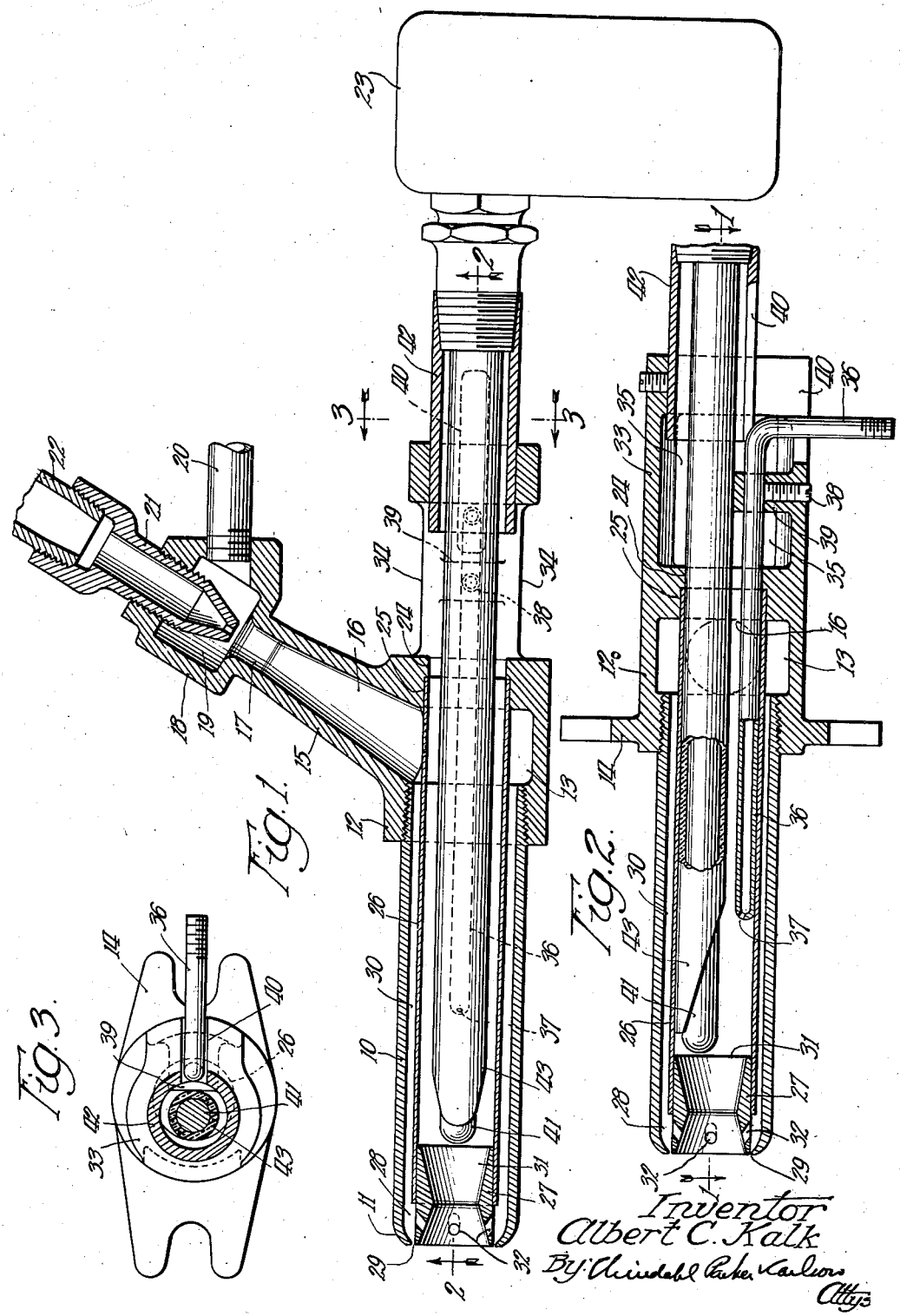

1,991,942

UNITED STATES PATENT OFFICE 1,991,942

BURNER

Albert C. Kalk, Chicago, Ill., assignor to The G. W. Dulaney Trust, Chicago, Ill., a common law trust Application July 21, 1930, Serial No. 469,366

6 Claims. (Cl. 158—109)

The present invention relates to improvements in gas burners.

One of the primary objects of the present invention resides in the provision of a novel gas burner provided with a pilot burner and means for cutting off the supply of air in the event that the pilot burner becomes extinguished.

Another object resides in the provision of a new and improved burner including as part of its unitary structure a thermostatic control element and a pilot burner arranged to direct its flame against the element.

Further objects and advantages will become apparent as the description proceeds.

In the accompanying drawing, Figure 1 is a longitudinal sectional view taken along line 1—1 of Fig. 2 of a burner embodying the features of my invention.

Fig. 2 is a longitudinal sectional view taken along line 2—2 of Fig. 1.

Fig. 3 is a transverse sectional view taken along line 3—3 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the burner constituting the exemplary embodiment of the invention comprises an elongated burner nozzle 10 adapted to be mounted in a suitable burner well (not shown). Preferably, the nozzle 10 is in the form of a tube of suitable material, the discharge end of which is formed with an inwardly curved peripheral lip 11, and the other end of which is threaded into a casing 12 formed with a fuel supply chamber 13. The casing 12 is formed with a mounting flange 14 adapted to be secured to the burner support (not shown).

A proportional mixer is provided for supplying a fuel mixture to the chamber 13. In the present instance, the mixer comprises an expanding mixing cone 15 defining a flaring passage 16 with a straight restricted throat 17 at the inlet end. Preferably, the cone 15 is formed integrally with the casing 12, and opens to one side of the chamber 13 at a slight angle. Mounted on the free end of the cone 15 and preferably integral therewith is a casing 18 defining a chamber 19 in communication with the throat 17, and adapted to be connected through a pipe 20 to a source (not shown) of one of the constituents of the fuel mixture, for example fuel gas.

Threaded through the outer end wall of the casing 18 into the chamber 19 and extending in axial alinement with the expanding cone 15 is a nozzle 21 which is adapted to be connected through a pipe 22 to a suitable source (not shown) of the other constituent of the fuel mixture. Preferably, the pipe 22 is connected to a suitable blower (not shown) for supplying air under pressure, and controlled by a suitable switch 23. The discharge end of the nozzle 21 is restricted, and is spaced slightly from the inlet of the throat 17 in position to discharge a stream of air under a high velocity into the throat. The stream of air will induce the flow of a proportionate volume of fuel gas from the chamber 19 into the throat 17. In passing through the tube 15, the air and gas will be thoroughly mixed.

It will be evident that the amount of fuel mixture supplied to the chamber 13 may be varied by regulating the amount of air supplied to the nozzle 21, without appreciably varying the air-gas ratio, and hence that if the blower is rendered inoperative through opening of the control switch 23, no flow of fuel from the pipe 20 to the chamber 13 will be induced. Preferably, means (not shown) are interposed in the pipe 20 to prevent any flow of fuel therethrough to the burner 10 when the air supply is cut off.

The rear end wall of the chamber 13 opposite the burner nozzle 10 is formed with an axially alined bore 24 the inner end of which has a countersunk recess 25. An elongated tube 26 is anchored at one end in the recess 25 with its inner surface flush with the surface of the bore 24, and extends through the chamber 13 and concentrically in peripherally spaced relation through the burner nozzle 10. The free end of the tube 26 terminates in the burner nozzle 10 a short distance from the curved lip 11. Mounted in the free end of the tube 26 and extending therefrom substantially into the plane of the lip 11 is a sleeve 27. The burner tube 10 and the sleeve 27 define an annular chamber 28 opening at the lip 11 through a restricted annular discharge orifice 29. The burner tube 10 and the inner tube 26 define an annular passage 30 opening from the supply chamber 13 in the casing 12 to the chamber 28.

The sleeve 27 preferably is formed with a Venturi passage 31 adapted to receive secondary air from the atmosphere through the tube 26. A plurality of peripherally spaced orifices 32, four in the present instance, are formed in the sleeve 27 and open from the chamber 28 to the expanding cone of the passage 31. Preferably, the orifices 32 are inclined inwardly and forwardly to direct a plurality of converging jets of fuel mixture out of the discharge end of the sleeve 27. These jets serve to break up the burner flame.

The casing 12 is provided with a rearward extension 33 which is cut away at opposite sides as indicated at 34 to form air inlet openings 35 establishing communication between the inner tube 26 and the atmosphere.

A primary pilot burner is provided for igniting the fuel mixture discharged from the sleeve 27. In the present instance, this pilot burner comprises a pipe 36 extending into the tube 26 and along the bottom thereof. The discharge end of the pipe 36 is formed with a jet orifice 37 inclined to direct a small stream of fuel gas at an angle upwardly into the passage 31.

The other end of the pipe 36 extends through and is secured as by means of a set screw 38 in an upstanding lug 39 formed in the bottom of the casing extension 33, and then is bent at right angles to extend out of the extension 33 through a longitudinal slot 40 in the bottom for connection to a source (not shown) of fuel gas. It will be evident that the pilot burner is adjustable longitudinally upon loosening the set screw 38, and that in such adjustment the slot 40 through coaction with the sides of the bent portion of the pipe 36 serves to maintain the discharge orifice 37 in the desired angular position.

Suitable thermostatic control means is provided for automatically cutting off the supply of fuel mixture in the event that the pilot burner 36 becomes extinguished. In the present instance, this means comprises an elongated cylindrical thermostatic element 41 one end of which is connected to the switch 23. The specific construction of the thermostatic element 41 and the switch 23 is not disclosed since per se it forms no part of the invention. It will suffice to say that when the element is heated it will close the switch 23 to establish operation of the blower, and that when it is not heated it will open the switch to stop the operation of the blower.

Preferably, the switch 23 is mounted on a sleeve 42 secured in the rear end wall of the casing extension 33. The thermostatic element 41 extends from the switch 23 through the sleeve 42, the casing extension 33, and into and closely along the top of the tube 26 directly over the pilot burner 36. The free end of the thermostatic element 41 terminates just short of the sleeve 27, and in position for impingement by the pilot flame. Excepting for the tip exposed to the pilot flame, the thermostatic element is enclosed with a covering 43 of suitable heat insulating material, such as asbestos.

The operation will be evident from the foregoing. Briefly stated, when the pilot burner is ignited, the pilot flame will impinge against the tip of the thermostatic element 41, thereby causing the switch 23 to be closed so that the blower will supply air to the pipe 22. Fuel mixture thus is supplied to the burner tube 10 and to the orifices 32. Should the primary pilot burner become extinguished, the thermostatic element 41 in the absence of the flame will cool, thereby causing the switch 23 to be opened. As a result, the supply of air under pressure to the proportional mixer will be discontinued, and hence no fuel mixture will be supplied.

It will be evident that I have provided a novel burner comprising a pilot burner and a thermostatic control responsive to the primary burner in a unitary construction which is simple, compact, and inexpensive, and which is efficient and safe in operation.

I claim as my invention:—

1. A burner comprising, in combination, a casing forming a fuel chamber, a burner nozzle mounted on said casing and communicating with said chamber, a tube extending through said chamber into said nozzle, said tube being peripherally spaced from said nozzle to define a passage therewith, one end of said tube being open to the atmosphere and the other end of said tube terminating short of the discharge end of said nozzle, an elongated thermostatic element extending into said tube, and a pilot burner extending into said tube in parallel relation to said element, said pilot burner being formed with an inclined orifice for directing a pilot flame to impinge against the tip of said element.

2. A burner comprising, in combination, an elongated burner tube, an inner concentric tube defining a peripheral passage therewith, means for supplying fuel to said passage, said inner tube being connected to a source of air and terminating in the discharge end of said burner tube, and a pilot burner extending into said inner tube longitudinally thereof, said pilot burner being adjustable longitudinally of said inner tube.

3. A burner comprising, in combination, an outer tube, the discharge end of said tube being turned in to form a lip, an inner air tube extending through said outer tube, and terminating in said discharge end, a sleeve mounted in said inner tube and projecting therefrom substantially into the plane of said lip and defining therewith an annular discharge orifice, a plurality of peripherally spaced orifices formed in said sleeve and opening therethrough, said orifices being inclined in directions converging at a point beyond said discharge end of said outer tube, and means for supplying a fuel mixture to said outer tube.

4. A burner comprising, in combination, an elongated burner nozzle, a hollow central air supply member extending longitudinally within said nozzle, a sleeve mounted in said member and projecting therefrom to the discharge end of said nozzle, said member opening to said sleeve, a plurality of peripherally spaced orifices formed in said sleeve and opening therethrough from said nozzle to the interior of said sleeve, and means for supplying fuel to said nozzle.

5. A burner comprising, in combination, a burner nozzle, a tube within said nozzle and terminating short of the discharge end thereof, a sleeve mounted in said tube and projecting therefrom substantially to said discharge end, said sleeve defining a peripheral discharge orifice with said nozzle and being formed with a Venturi passage, a plurality of peripherally spaced orifices formed in said sleeve and opening from said nozzle to the expanding cone of said passage, and means for supplying fuel to said nozzle.

6. A burner comprising, in combination, a casing, an elongated hollow burner nozzle connected to said casing, an elongated thermostatic element in said nozzle, an elongated pilot burner in said nozzle, said pilot burner having an inclined discharge orifice orientated to direct the pilot flame against said element, means for adjusting said pilot burner longitudinally, and means for preventing rotation of said pilot burner during adjustment thereof to maintain said orientation.

ALBERT C. KALK.